United States Patent
Bertz et al.

(10) Patent No.: US 8,484,707 B1
(45) Date of Patent: Jul. 9, 2013

(54) SECURE CHANGING AUTO-GENERATED KEYS FOR WIRELESS ACCESS

(75) Inventors: Lyle T. Bertz, Lee's Summit, MO (US); Robert H. Burcham, Overland Park, KS (US); Jason R. Delker, Olathe, KS (US)

(73) Assignee: Spring Communications Company L.P., Overland Park, KS (US)

( * ) Notice: Subject to any disclaimer, the term of this patent is extended or adjusted under 35 U.S.C. 154(b) by 6 days.

(21) Appl. No.: 13/156,438

(22) Filed: Jun. 9, 2011

(51) Int. Cl.
*G06F 21/00* (2006.01)

(52) U.S. Cl.
USPC .......... 726/6; 726/5; 726/18; 726/20; 705/65; 705/66; 705/67; 705/68; 705/69; 713/172; 713/173; 713/174

(58) Field of Classification Search
USPC .............................................. 726/6, 5, 18, 20
See application file for complete search history.

(56) References Cited

U.S. PATENT DOCUMENTS

| | | | |
|---|---|---|---|
| 6,622,083 B1 | 9/2003 | Knockeart et al. | |
| 7,209,964 B2* | 4/2007 | Dugan et al. | 709/223 |
| 7,376,392 B2 | 5/2008 | Myojo | |
| 7,454,473 B2 | 11/2008 | Suzuki | |
| 7,912,224 B2* | 3/2011 | Lee et al. | 380/278 |
| 7,966,111 B2 | 6/2011 | Moinzadeh et al. | |
| 2003/0096641 A1 | 5/2003 | Odinak | |
| 2003/0120601 A1* | 6/2003 | Ouye et al. | 705/51 |
| 2004/0125957 A1* | 7/2004 | Rauber et al. | 380/259 |
| 2005/0021744 A1* | 1/2005 | Haitsuka et al. | 709/224 |
| 2005/0113102 A1 | 5/2005 | Kwon et al. | |
| 2007/0113269 A1* | 5/2007 | Zhang | 726/4 |
| 2008/0072047 A1* | 3/2008 | Sarikaya et al. | 713/171 |
| 2008/0307086 A1* | 12/2008 | Brooks et al. | 709/223 |
| 2009/0028082 A1* | 1/2009 | Wynn et al. | 370/310 |
| 2009/0109941 A1* | 4/2009 | Carter | 370/338 |
| 2010/0197362 A1 | 8/2010 | Saitoh et al. | |
| 2010/0220250 A1 | 9/2010 | Vanderwall et al. | |
| 2010/0235285 A1* | 9/2010 | Hoffberg | 705/75 |
| 2010/0260350 A1 | 10/2010 | Chutorash et al. | |
| 2011/0099316 A1 | 4/2011 | Tseng et al. | |
| 2011/0257973 A1 | 10/2011 | Chutorash et al. | |
| 2011/0263293 A1 | 10/2011 | Blake et al. | |
| 2011/0310731 A1* | 12/2011 | Park et al. | 370/230 |
| 2012/0134497 A1* | 5/2012 | Roitshtein et al. | 380/259 |
| 2012/0183221 A1 | 7/2012 | Alasry et al. | |

FOREIGN PATENT DOCUMENTS

JP 2006244164 A * 9/2006

OTHER PUBLICATIONS rfc3748, Extensible Authentication Protocol (EAP), Jun. 2004.*
ieee 802.1x, port-based network access control, 2010.*
ieee 802.11i, Wireless LAN MAC, 1999.*
ieee 802.11r, Wireless LAN MAC and PHY layer, 2008.*
Shipley, Trevor D., et al. Patent Application entitled "Mobile Communication System Identity Pairing," filed on Aug. 26, 2011, U.S. Appl. No. 13/218,503.

(Continued)

*Primary Examiner* — Andy Rao
*Assistant Examiner* — Shan Elahi (57) ABSTRACT

A method for granting secure network access comprising requesting, by a mobile device, access to a network via an access point; receiving a passcode from the access point; sending a message including the passcode and an indicia back to the access point; and generating, by the access point, a secure key based on the indicia, the secure key providing network access to the mobile device.

14 Claims, 6 Drawing Sheets

OTHER PUBLICATIONS

Ng, Sei Y., Patent Application entitled "Head Unit to Handset Interface and Integration," Filed on Sep. 27, 2011, U.S. Appl. No. 13/246,554.

First Action Interview Pre-Communication dated Aug. 21, 2012, U.S. Appl. No. 13/218,503, filed on Aug. 26, 2011.

First Action Interview Office Action dated Jan. 3, 2013, U.S. Appl. No. 13/218,503, filed on Aug. 26, 2011.

First Action Interview Pre-Communication dated Jan. 31, 2012, U.S. Appl. No. 13/246,554, filed on Sep. 27, 2011.

FAIPP Office Action dated May 21, 2012, U.S. Appl. No. 13/246,554, filed on Sep. 27, 2011.

Final Office Action dated Sep. 5, 2012, U.S. Appl. No. 13/246,554, filed on Sep. 27, 2011.

Advisory Action dated Nov. 2, 2012, U.S. Appl. No. 13/246,554, filed on Sep. 27, 2011.

Office Action dated Dec. 5, 2012, U.S. Appl. No. 13/246,554, filed on Sep. 27, 2011.

* cited by examiner

SECURE CHANGING AUTO-GENERATED KEYS FOR WIRELESS ACCESS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Users of mobile devices may access a network, such as the internet, through an access point. Access points such as WiFi connections may be found in locations such as coffee shops, hotels, restaurants, and airports. Access to networks via access points may require some form of security, such as a password. In some cases, proprietors of businesses that offer network access via access points may provide passwords to customers, in order to limit access to their access points.

SUMMARY

In an embodiment, a method for granting network access is disclosed. The method comprises requesting, by a mobile device, access to a network via an access point; receiving a passcode from the access point; sending a message including the passcode and an indicia back to the access point; and generating, by the access point, a secure key based on the indicia, the secure key providing network access to the mobile device.

In an embodiment, a system for managing network access rules is disclosed. The method comprises a mobile device to request access to a network; an access point to receive the request, send a passcode to the mobile device, receive a reply from the mobile device, the reply including the passcode and an indicia, and generate a secure key based on the indicia; and a rules engine to determine network access to the mobile device, based on a rule.

In an embodiment, a method for charging for network access is disclosed. The method comprises requesting, by a mobile device, access to a network via an access point; receiving a passcode from the access point; sending a message including the passcode and an indicia back to the access point; generating, by the access point, a secure key based on the indicia, the secure key providing network access to the mobile device, via the access point; and logging the network access as a chargeable event.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a system and methods of providing a mobile device with access to a network is disclosed. A mobile device may access a network, such as the internet, by way of an access point. Access points may be wireless and may provide secured or unsecured access. The disclosure describes a system and method of providing access on a permanent or temporary basis to a mobile device. For example, a vehicle such as an automobile may contain a wireless access point. Accessing a network via the access point may incur charges to the owner of the vehicle, who may therefore wish to limit or control access thereto.

For example, when an owner of the automobile offers a ride to a friend (i.e. a passenger), the passenger may wish to have access to the automobile access point in order to access the internet with their mobile device. The passenger may attempt to access the internet via the access point of the automobile. The access point may detect the attempt, and may respond by sending a passcode to the mobile device. The passenger may then respond to the access point with a reply that contains the passcode and may further include indicia of the mobile device. The access point may then receive the reply, verify that it includes the passcode, and generate a secure key, based at least in part on the indicia of the mobile device. The owner of the automobile may designate to the access point that the passenger is granted access to a network via the access point, either permanently or temporarily. For example, the owner may designate that the passenger is granted access to the access point for one day. A rules engine may then set a rule that provides network access to the mobile device of the passenger for one day. The passenger may then have network access for one day, after which the secure key is terminated or expires, preventing the mobile device from having access to the network via the access point.

In another embodiment, a rental car company may setup an access point in a rental car. A renter of the rental car may then request access to a network, for a mobile device, via the rental car access point. When the access point receives a request for network access from the mobile device of the renter, the access point may send a message including a passcode to the mobile device of the renter. The message may further include a notification that accessing the access point will incur by the renter a charge above and beyond the charge for the rental car, and that accepting access may constitute acceptance of the charge. The mobile device of the renter may then reply to the access point with a message including the passcode and indicia of the mobile device. The access point may then receive the reply, verify that it includes the passcode, and generate a secure key, based at least in part on the indicia of the mobile device. The access point may thereby grant network access to the mobile device and may record a chargeable event related thereto. In addition, the rental car renter may similarly permit a passenger of the rental car to gain access to a network via the same process and may incur an additional chargeable event for the additional network access for the passenger. The chargeable event or events may be recorded and/or logged for subsequent billing.

Figure 1:
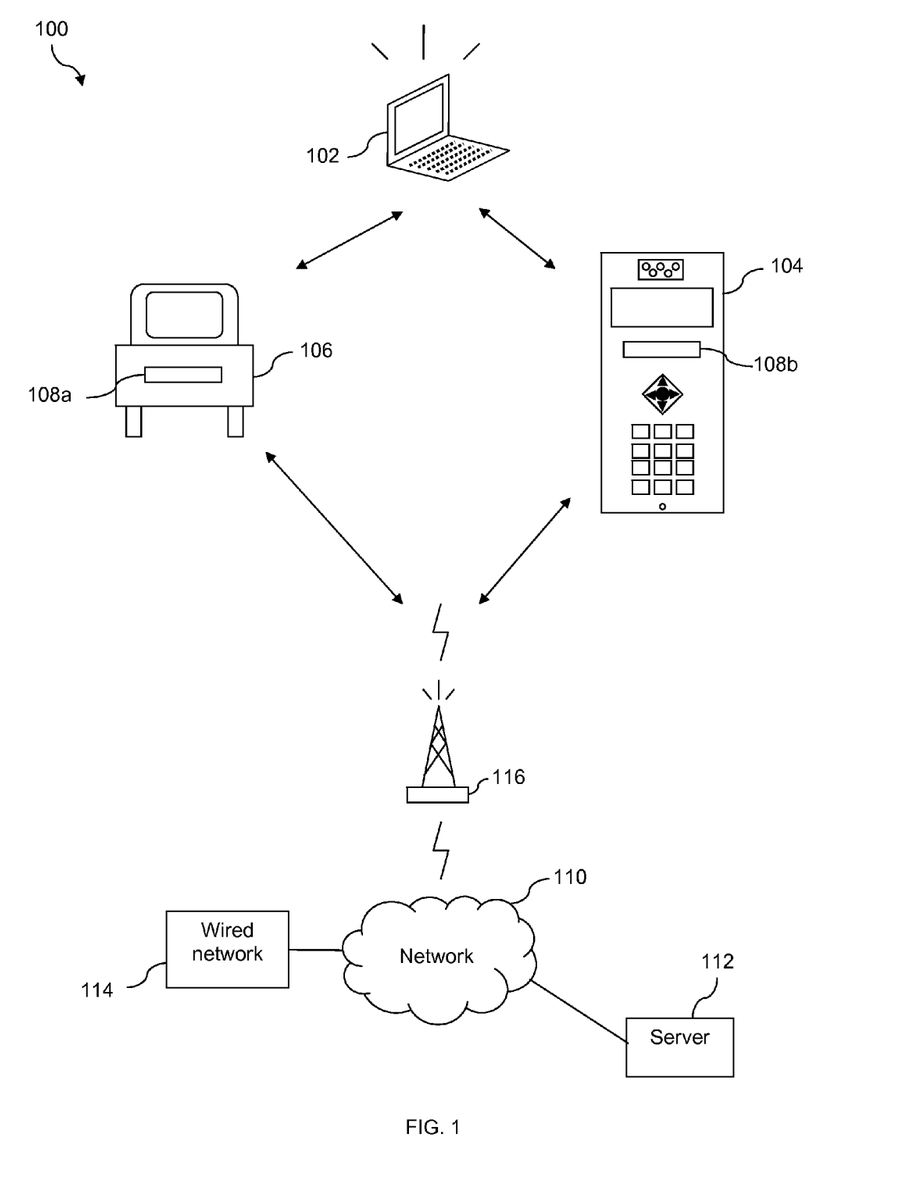
FIG. 1 illustrates a communications system according to an embodiment of the disclosure.

Turning now to FIG. 1, a network access system 100 is illustrated. System 100 comprises a first mobile device 104, a second mobile device 104, a vehicle 106, access points 108a and 108b, a network 110, a server 112, a wired network 114, and a base transceiver station (BTS) 116. As illustrated in FIG. 1, there may be an access point 108a in vehicle 106 and/or an access point 108b in second mobile device 104. The access points 108a, 108b may be configured to connect wirelessly to the network 110, via BTS 116. First mobile device 104 may hereinafter be referred to as laptop computer 104, to avoid confusion with second mobile device 104, which will hereinafter be referred to as mobile phone 104. First mobile device 104 and second mobile device 104 may be any form of mobile device such as a mobile phone, a wireless handset, a pager, a personal digital assistant (PDA), a gaming device, an inventory control device, a media player, a portable computer, a tablet computer, a netbook computer, a laptop computer, and/or other form of mobile device.

Figure 2:
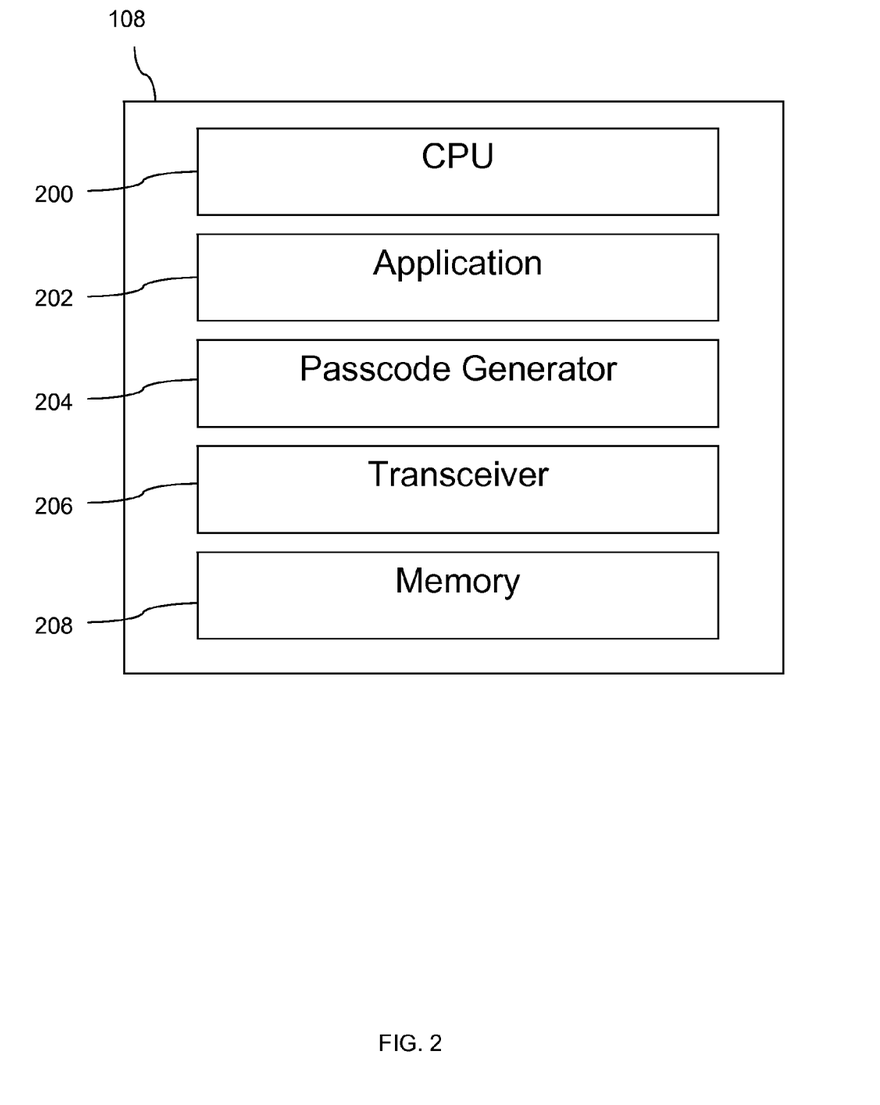
FIG. 2 illustrates an access point, according to an embodiment of the disclosure.

FIG. 2 illustrates additional details of access point 108. Access point 108 comprises a central processing unit (CPU) 200, an application 202, a passcode generator 204, a transceiver 206, and a memory 208. In an embodiment, access points 108a and 108b may be the same or similar. For the sake of clarity and brevity, only one access point 108 is illustrated in FIG. 2, and only one access point 108 will be described. It should be understood by one of ordinary skill in the art, however, that access points 108a, 108b need not be identical in structure or function, but may both be capable of providing a mobile device with access to a network in the same or similar fashion. In the disclosure, the term "access point 108" should be taken to be interchangeable with and the same as either-or-both terms "access point 108a" and/or "access point 108b". Whenever any of these three terms are used in the disclosure, they should be taken to mean the same or similar access points.

CPU 200 may be any processor capable of providing suitable functionality for access point 108. CPU's such as CPU 200 are widely know to those of ordinary skill in the art, and will not be described or discussed further.

Application 202 may comprise any software and/or firmware necessary to facilitate the functionality of access point 108, with respect to providing network connectivity to a mobile device. Application 202 may comprise a compiled set of machine-readable instructions that configure the access point 108 to provide the desired functionality, or the application software may be high-level software instructions to be processed by an interpreter or compiler to indirectly configure the access point 108. In an embodiment, application 202 may be or may contain a rules engine or such that may monitor a rule that is setup to permit access to another device, such as a mobile device, as will be discussed in detail, below.

Passcode generator 204 may be an application, firmware, and/or hardware and may be configured to generate a passcode suitable for use as described herein below in greater detail. In an embodiment, passcode generator 204 may be a part of application 202, and may be provided therein for the same or similar purposes as described in more detail, below.

Transceiver 206 may be a wireless system, similar to that of a mobile communications device such as mobile phone 104, and may be arranged and configure to communicate wirelessly with, for example, BTS 116. Wireless telecommunications between mobile devices and base transceiver stations are well known to those of ordinary skill in the art. Embodiments of an access point 108 are discussed below, with reference to FIG. 5, below.

Memory 208 may be, for example, random access memory (RAM) or similar, and may store applications such as application 202. Application 202, passcode generator 204, and/or other applications may be stored in the memory 208. These and other functions of memory 208 are also well known to those of ordinary skill in the art.

In an embodiment the laptop computer 104 may be used by a passenger in vehicle 106, who may wish to connect to a network, such as network 110. The passenger may open a web browser within the laptop computer 104, in an attempt to access network 110. When laptop computer 104 opens the web browser, access point 108a may detect the attempt to access network 110 as an inquiry or request from laptop computer 104. Access point 108 may establish a temporary or provisional link with laptop computer 104 to, for example, interact with laptop computer 104 for determining whether or not to grant access to network 110. In response to detecting the attempt, passcode generator 204 in access point 108a may generate a passcode. The passcode may then be transmitted in a message to laptop computer 104 via transceiver 206. The passcode may be, for example, a password, a secret word, or a string of characters used for authentication, to prove identity, gain access, or the like, and may be communicated to laptop computer 104 via an email, a short message service (SMS) message, or other suitable form of message. In an embodiment, passcode generator 204 may be a rule engine, as may be known to one of ordinary skill in the art. As such, passcode generator 204 may function as a gatekeeper that grants and revokes access, based on a rule or metric that may be predetermined and/or user selectable, as will be discussed in greater detail, below.

Alternatively, the passcode may appear as, for example, a popup on the display of laptop computer 104. The message may be sent and/or received by any suitable method, such as, for example BLUETOOTH technology or other wireless technology. Laptop computer 104 may then reply to the message from access point 108a with a message containing the passcode, for example simply by returning the same message sent by access point 108a. The message may further contain indicia of the laptop computer 104. The indicia may be a form of identification number of other identifier, such as, for example, a media access control (MAC) address, an electronic serial number (ESN), a mobile identification number (MIN), and international mobile equipment identifier (IMEI), a mobile equipment identifier (MEID), or other suitable indicia for laptop computer 104. Access point 108a may receive the message, and verify that it contains the passcode that access point 108a sent to laptop computer 104, and may generate a security key associated with the indicia of laptop computer 104 and/or the passcode. This secure key may be retained by access point 108a and may be used exclusively for laptop computer 104 to access network 110.

Once access point 108a has granted network access to laptop computer 104, access point 108a may communicate wirelessly with BTS 116, which may then communicate wirelessly with network 110. The wireless connection between access point 108a and BTS 116 may thereby complete the wireless connection between laptop computer 104 and network 110. Laptop computer 104 may thereby access other resources such as server 112, wired network 114, and other resources that may be accessible via network 110, such as the internet.

In an alternative embodiment, the passcode may be displayed on a display within vehicle 106. The display may be a computer screen or other form of display that may be a part of access point 108a, of vehicle 106 itself, or some other display or device for conveying the passcode to either the driver or a passenger of the vehicle 106. The passcode can then either be read by the driver and communicated to the passenger, or read directly by the passenger. The passenger that desires network access may then enter the passcode into laptop computer 104 and the process of acquiring access may continue as before, such that laptop computer 104 is permitted access to network 110 via access point 108a.

In still another embodiment, the passcode may be aurally communicated via, for example, an audio system within vehicle 106. The driver may hear the passcode, convey it to the passenger, who may then type it into a messaging system of laptop computer 104 and transmit it wirelessly to access point 108a or 108b, as appropriate in a given situation, as described herein. Alternatively, the passenger him/herself may hear the passcode directly from the source, and may proceed as above.

In another embodiment, vehicle 106 may not contain an access point such as access point 108a. In this embodiment, a driver or a passenger of vehicle 106 may have a mobile device such as mobile phone 104 that is equipped with an access point such as access point 108b. Similar to the above example, a passenger of vehicle 106 may attempt to access network 110. Access point 108b in mobile phone 104 may detect the attempt and may, via any suitable means, transmit a passcode to laptop computer 104. Laptop computer 104 may then, by any suitable means, send a message back to access point 108b containing the passcode and indicia of the laptop computer 104. As above, access point 108b may then receive the message containing the passcode it sent to laptop computer 104 and the indicia of laptop computer 104 (e.g. a MAC address) and may generate a secure key for laptop computer 104. This secure key may establish an identity for laptop computer 104 with access point 108b, which may be stored in mobile phone 104 and/or access point 108b and utilized for future recognition of this particular laptop computer 104 by access point 108b. Mobile phone 104 may then communicate wirelessly with BTS 116, as above, which may then communicate with network 110, and thereby establish a wireless connection between laptop computer 104 and network 110. As before, laptop computer 104 may then access other resources of network 110 such as server 112 and wired network 114, and others.

In an embodiment, access point 108 may be configured to retain the secure key for a given wireless device, and may keep the secure key stored, for example, in memory 208, for a given period of time, a given number of accesses, or any other suitable metric. Access point 108 operator (e.g. the driver of vehicle 106), may be provided with a means of interacting with access point 108. For example, access point 108 may be configured with a keyboard, a touch-pad, voice recognition, a touch-screen, or other form of input. Via this input arrangement, the access point 108 operator may input a parameter to designate the metric for the security key. In an embodiment, access point 108 may provide a display that queries an operator of the access point 108 as to the desired metric for the security key. Access point 108 may provide a menu of choices, such as a duration for the security key of one hour, one day, one week, one month, permanently, or other duration. Alternatively, access point 108 may permit the operator to designate a number of accesses with which to permit a user to access network 110 with the granted security key. For example, the security key may be configured to permit one network 110 access, five network 110 accesses, fifty network 110 accesses, any number of network 110 accesses, or an unlimited number of network 110 accesses. In an embodiment, access point 108 may be configured to permit access to network 110 for any time, duration, number of accesses, or any other metric in order to limit, restrict, or permit access via access point 108 to network 110.

In an embodiment, access point 108 may be provided with a default metric, such that, if an operator does not designate the metric for permission, a default quantity or duration is selected by access point 108. In addition or alternatively, an operator may be permitted to determine and select the value for the default metric, such that anytime the operator does not specify the metric, access point 108 may use the operator's pre-selected default metric.

In yet another embodiment, access point 108 may be configured to capture and retain the indicia of a mobile device such as laptop computer 104, and store it in memory 208. Access point 108 may thereby recognize the mobile device when it requests access to network 110, and may automatically generate a security key. This auto-generation may be configurable by an operator of the access point 108, such that the operator may designate that a particular device be granted access to network 110 via access point 108, whenever this mobile device attempts access. This auto-generated security key may then expire whenever access is terminated, as in when the mobile device shuts down or terminates a session with network 110. Access point 108 may then generate a new, different security key, the next time this same device tries to access the network 110 via access point 108. Alternatively, the security generated by access point 108 may be the same or similar to a prior security key for this or any mobile device. In an embodiment, access point 108 may auto-generate a security key of any type, and in any fashion suitable to achieve a desired result.

In an embodiment, a rental car company may provide an access point 108 in a rental car. If, for example, a renter of the rental car wishes to access a network, such as network 110, the rental car access point 108 may alert the renter that there will be a charge associated with accessing network 110 via access point 108, for example, a fee for receiving communications provided by a telecommunications service provider. When the renter attempts to access the network, the access point 108 may display a screen with a message such as "Attention: There will be a $XX charge for accessing the wireless network with the access point in this vehicle—the charge will appear on your rental bill. Please indicate your acceptance of this charge by selecting OKAY". In an embodiment, any such alert message may be given, either visually or aurally, to inform the renter that accessing network 110 via access point 108 will incur a charge. If the renter accepts the charge, and any conditions included therewith, access point 108 may permit access to network 110, as described above, and may record a chargeable event. Access point 108 may, for example, store a chargeable event in memory 208, in order to inform the rental car company that the renter has used the access point 108.

In another embodiment, the access point 108 may also log the amount of time the renter accesses the network. In this manner, if appropriate, the rental car company may charge the renter a time-based rate for access to network 110. When a renter returns the rental car to the rental car company, an agent of the rental car company may download information from access point 108, in order to ascertain whether or not the renter utilized access point 108 and/or the quantity and/or duration of accesses, if appropriate. This download may be by cable, wireless, BLUETOOTH, or other suitable method of downloading or otherwise transferring information from access point 108 to the rental car company. The rental car company may then take the chargeable event and add the appropriate charges to the rental car renter's bill. In another embodiment, access point 108 may wirelessly transmit the chargeable event to the rental car company via, for example BTS 116 or other suitable wireless system, directly from the rental car to the rental car company. This may be done on-the-fly, as the chargeable event transpires or accrues, at the end of each day that the renter retains the rental car, when the renter returns the rental car, or at or during any other time or event, as may be desirable for a given situation.

Figure 3:
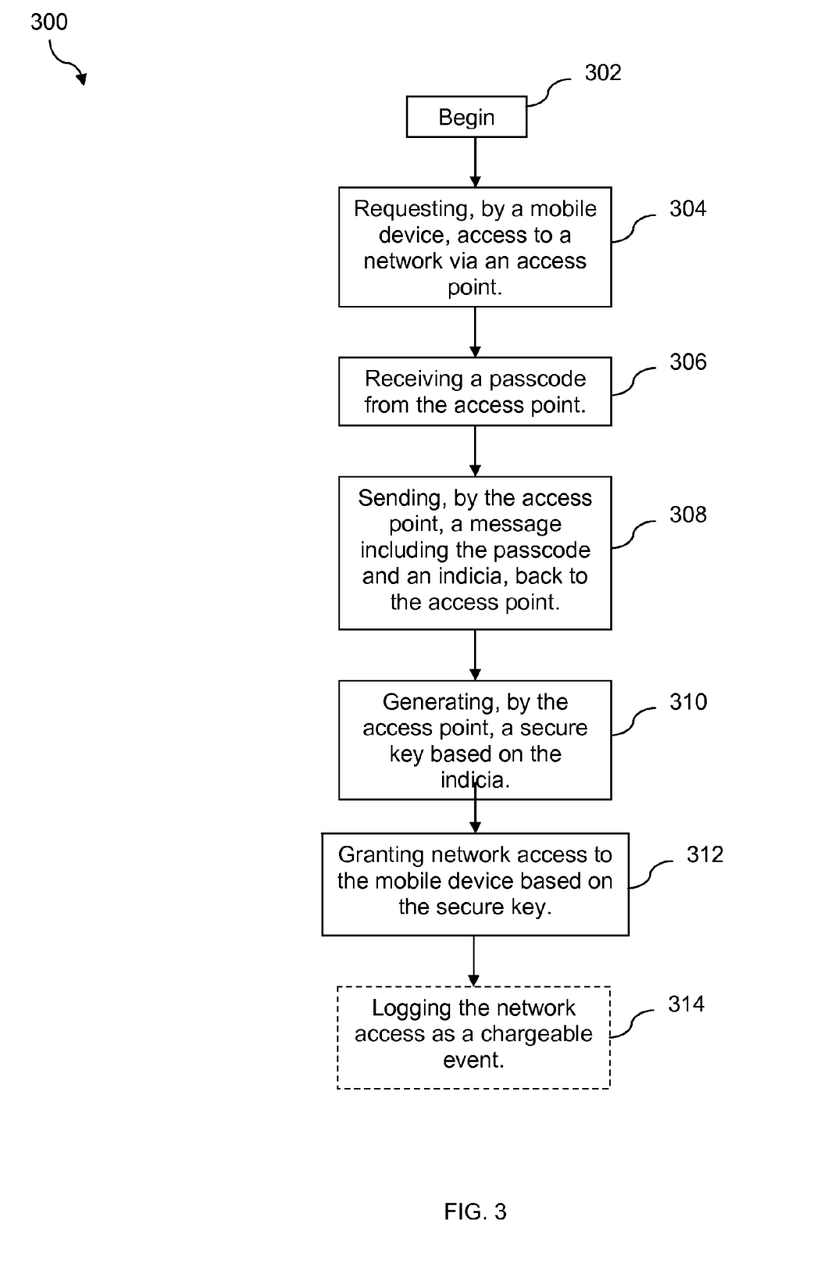
FIG. 3 illustrates a flowchart according to an embodiment of the disclosure.

FIG. 3 illustrates a method 300 of the disclosure. In step 302, the method begins. In step 304, a mobile device may request access to a network via an access point. In step 306, the mobile device receives a passcode from the access point. At step 308, the mobile device sends a message, including the passcode and indicia of the mobile device, to the access point. At step 310, the access point receives the message and generates a secure key based on the indicia. At step 312, the access point grants network access to the mobile device, based on the secure key. At optional step 314, the network access is recorded as a chargeable event.

Figure 4:
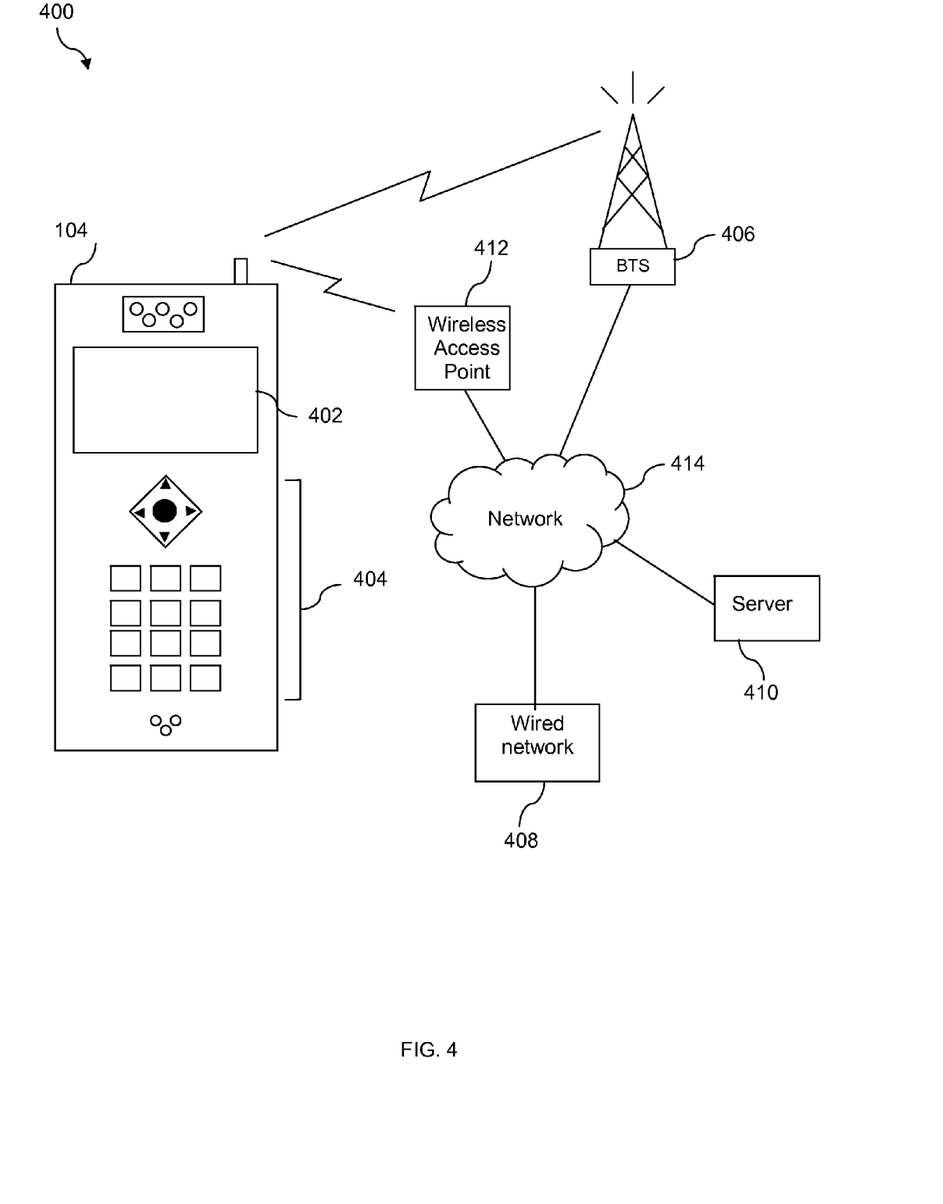
FIG. 4 illustrates a mobile communication system according to an embodiment of the disclosure.

FIG. 4 shows a wireless communications system 400 including the mobile device 104. FIG. 4 depicts the mobile device 104, which is operable for implementing aspects of the present disclosure, but the present disclosure should not be limited to these implementations. Though illustrated as a mobile phone, the mobile device 104 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 104 is not a general purpose computing device like a portable, laptop or tablet computer, but rather is a special-purpose communications device such as a mobile phone, wireless handset, pager, or PDA. The mobile device 104 may support specialized activities such as gaming, inventory control, job control, and/or task management functions, and so on.

The mobile device 104 includes a display 402 and a touch-sensitive surface and/or keys 404 for input by a user. The mobile device 104 may present options for the user to select, controls for the user to actuate, and/or cursors or other indicators for the user to direct. The mobile device 104 may further accept data entry from the user, including numbers to dial or various parameter values for configuring the operation of the handset. The mobile device 104 may further execute one or more software or firmware applications in response to user commands. These applications may configure the mobile device 104 to perform various customized functions in response to user interaction. Additionally, the mobile device 104 may be programmed and/or configured over-the-air, for example from a wireless base station, a wireless access point 412, a network 414, or a peer mobile device 104.

The mobile device 104 may execute a web browser application which enables the display 402 to show a web page. The web page may be obtained via wireless communications with a base transceiver station (BTS) 406, a wireless network access node, a peer mobile device 104 or any other wireless communication network or system. While a single BTS 406 is illustrated, it is understood that the wireless communication system may comprise additional base transceiver stations. In some instances, the mobile device 104 may be in communication with multiple base transceiver stations 406 at the same time. The BTS 406 (or wireless network access node) is coupled to a wired network 408, such as the Internet. Via the wireless link and the wired network, the mobile device 104 has access to information on various servers, such as a server 410. The server 410 may provide content that may be shown on the display 402. Alternately, the mobile device 104 may access the BTS 406 through a peer mobile device 104 acting as an intermediary, in a relay type or hop type of connection.

Figure 5:
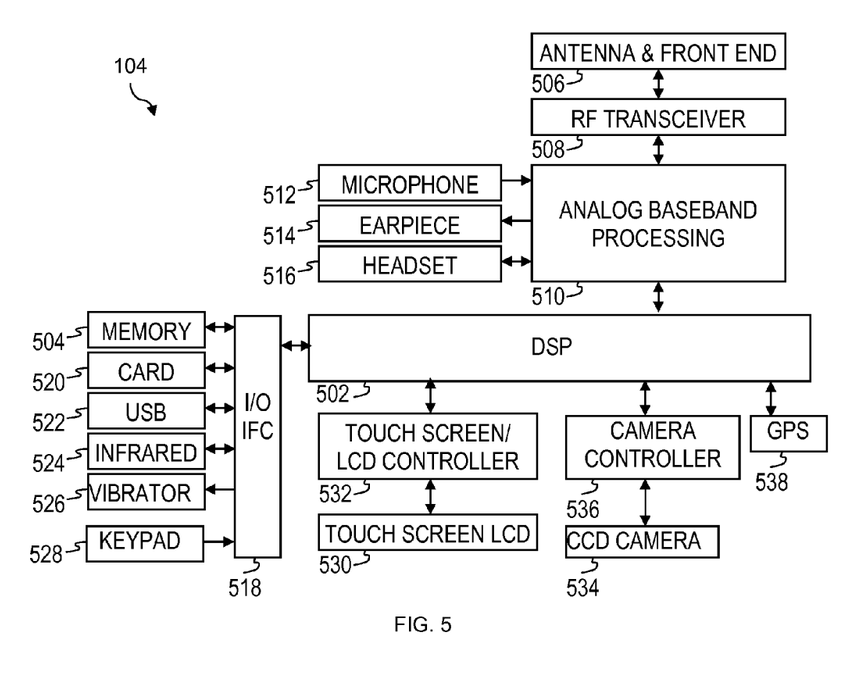
FIG. 5 illustrates a block diagram of a mobile device, according to an embodiment of the disclosure.

FIG. 5 shows a block diagram of the mobile device 104. While a variety of known components of handsets 104 are depicted, in an embodiment a subset of the listed components and/or additional components not listed may be included in the mobile device 104. The mobile device 104 includes a digital signal processor (DSP) 502 and a memory 504. As shown, the mobile device 104 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 104 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 104 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 104 to send and receive information from a radio access network (RAN) or some other available wireless communications network or from a peer mobile device 104. In an embodiment, the antenna and front end unit 506 may include multiple antennas to support beam forming and/or multiple input multiple output (MIMO) operations. As is known to those skilled in the art, MIMO operations may provide spatial diversity which may be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 104 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 104 to function as a peripheral device to exchange information with a personal computer or other computer system. The infrared port 524 and other optional ports such as a BLUETOOTH interface or an IEEE 802.11 compliant wireless interface may enable the mobile device 104 to communicate wirelessly with other nearby handsets and/or wireless base stations.

The input/output interface 518 may further connect the DSP 502 to the vibrator 526 that, when triggered, causes the mobile device 104 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 104. Another input mechanism may be the touch screen LCD 530, which may also display text and/or graphics to the user. The touch screen LCD controller 532 couples the DSP 502 to the touch screen LCD 530.

The CCD camera 534 enables the mobile device 104 to take digital pictures. The DSP 502 communicates with the CCD camera 534 via the camera controller 536. The GPS sensor 538 is coupled to the DSP 502 to decode global positioning system signals, thereby enabling the mobile device 104 to determine its position. In another embodiment, a camera operating according to a technology other than charge coupled device cameras may be employed. Various other peripherals may also be included to provide additional functions, e.g., radio and television reception.

Figure 6:
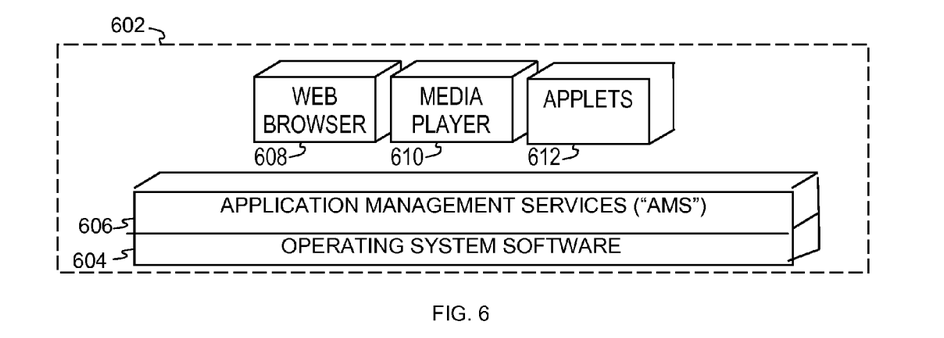
FIG. 6 illustrates a software environment, according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 104. Also shown in FIG. 6 are a web browser application 608, a media player application 610, and JAVA applets 612. The web browser application 608 configures the mobile device 104 to operate as a web browser, allowing a user to enter information into forms and select links to retrieve and view web pages. The media player application 610 configures the mobile device 104 to retrieve and play audio or audiovisual media. The JAVA applets 612 configure the mobile device 104 to provide games, utilities, and other functionality.

Figure 7:
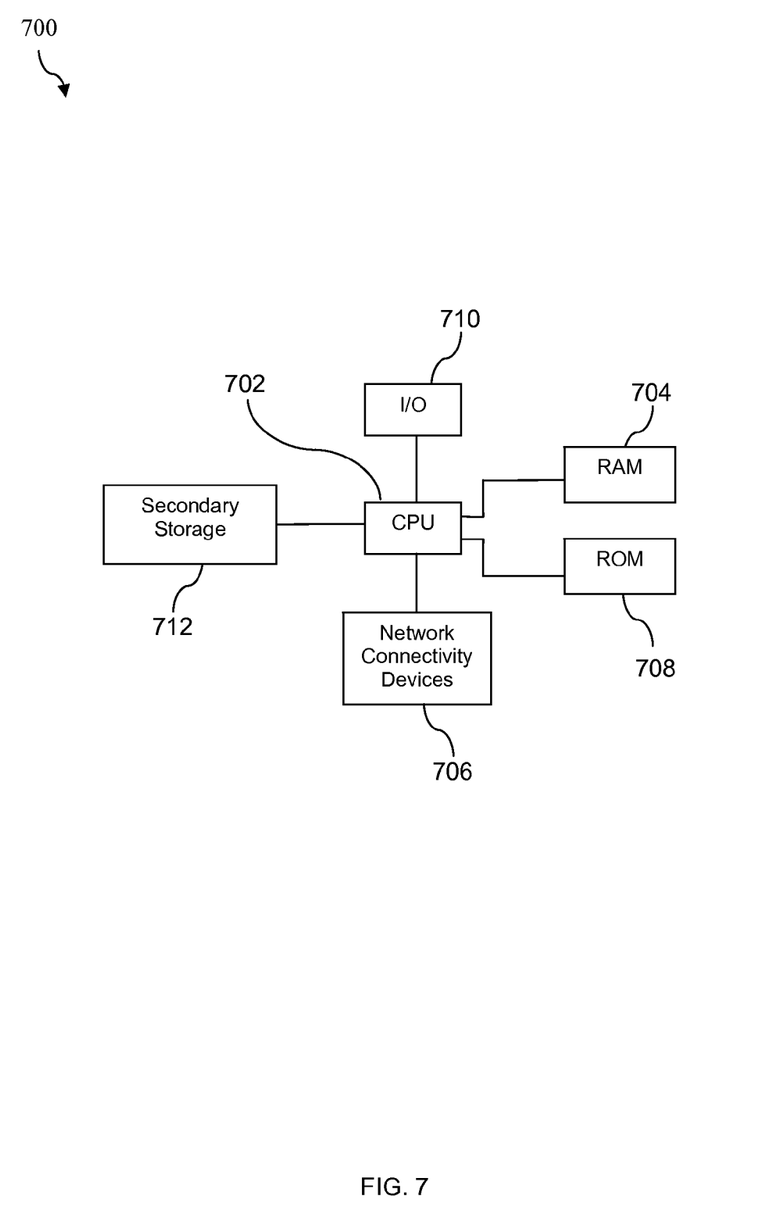
FIG. 7 illustrates a computer system, according to an embodiment of the disclosure.

FIG. 7 illustrates a computer system 700 suitable for implementing one or more embodiments disclosed herein. The computer system 700 includes a processor 702 (which may be referred to as a central processor unit or CPU) that is in communication with memory devices including secondary storage 712, read only memory (ROM) 708, random access memory (RAM) 704, input/output (I/O) devices 710, and network connectivity devices 706. The processor 702 may be implemented as one or more CPU chips.

It is understood that by programming and/or loading executable instructions onto the computer system 700, at least one of the CPU 702, the RAM 704, and the ROM 708 are changed, transforming the computer system 700 in part into a particular machine or apparatus having the novel functionality taught by the present disclosure. It is fundamental to the electrical engineering and software engineering arts that functionality that may be implemented by loading executable software into a computer may be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 712 is typically comprised of one or more disk drives or tape drives and is used for non-volatile storage of data and as an over-flow data storage device if RAM 704 is not large enough to hold all working data. Secondary storage 712 may be used to store programs which are loaded into RAM 704 when such programs are selected for execution. The ROM 708 is used to store instructions and perhaps data which are read during program execution. ROM 708 is a non-volatile memory device which typically has a small memory capacity relative to the larger memory capacity of secondary storage 712. The RAM 704 is used to store volatile data and perhaps to store instructions. Access to both ROM 708 and RAM 704 is typically faster than to secondary storage 712. The secondary storage 712, the RAM 704, and/or the ROM 708 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 706 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 706 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embodied in the carrier wave generated by the network connectivity devices 706 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 712), ROM 708, RAM 704, or the network connectivity devices 706. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 712, for example, hard drives, floppy disks, optical disks, and/or other device, the ROM 708, and/or the RAM 704 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 712, to the ROM 708, to the RAM 704, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 706. The computer program product may comprise instructions that promote the loading and/or copying of data, data structures, files, and/or executable instructions to the secondary storage 712, to the ROM 708, to the RAM 704, and/or to other non-volatile memory and volatile memory of the computer system 700.

In some contexts, a baseband signal and/or a signal embodied in a carrier wave may be referred to as a transitory signal. In some contexts, the secondary storage 712, the ROM 708, and the RAM 704 may be referred to as a non-transitory computer readable medium or a computer readable storage media. A dynamic RAM embodiment of the RAM 704, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for granting network access comprising:
   receiving, by an automobile access point that comprises a computer processor, a request to access a network via the automobile access point from a mobile device;
   generating, by the automobile access point, a passcode;
   sending, by the automobile access point, the passcode to the mobile device;
   receiving, by the automobile access point, a message from the mobile device, wherein the message includes the passcode and a media access control address of the mobile device;
   receiving, by the automobile access point, an input parameter from an automobile access point operator, wherein the input parameter designates one or more rules for a secure key, and wherein the one or more rules are based on at least a number of access attempts by the mobile device; and
   generating, by the automobile access point, the secure key based on the media access control address of the mobile device and the input parameter in response to receiving the message, wherein the secure key provides network access to the mobile device according to the one or more rules.

2. The method of claim 1, wherein the passcode is one of a secret word, a password, and a string of alphanumeric characters.

3. The method of claim 1, wherein the request from a mobile device is initiated by opening a web browser in the mobile device.

4. The method of claim 1, wherein sending the passcode comprises sending one or more of an email, a short messaging service message, a visual display, and an audible communication.

5. The method of claim 1, wherein the access point retains the secure key based on the one or more rules.

6. A system for managing network access rules comprising:
   an automobile access point comprising a computer processor that:
     receives a request from a mobile device to access a network via the automobile access point,
     generates a passcode,
     sends the passcode to the mobile device,
     receives a reply from the mobile device, wherein the reply includes the passcode and a media access control address of the mobile device,
     receives an input parameter from an automobile access point operator, wherein the input parameter designates one or more rules for a secure key, and wherein the one or more rules are based on at least a number of access attempts by the mobile device, and
     generates the secure key based on the media access control address of the mobile device and the input parameter in response to receiving the reply, wherein the secure key provides network access to the mobile device according to the one or more rules; and
   a rules engine configured to determine network access to the mobile device based on the one or more rules.

7. The system of claim 6, wherein the passcode is one of a secret word, a password, and a string of alphanumeric characters.

8. The system of claim 6, wherein the request from the mobile device is initiated by requesting, by opening a web browser in the mobile device.

9. The system of claim 6, wherein sending the passcode comprises sending one or more of an email, a short messaging service message, a visual display, and an audible communication.

10. The system of claim 6, wherein the access point retains the secure key based on the one or more rules.

11. A method for charging for network access comprising:
receiving, by an automobile access point that comprises a computer processor, a request to access a network via the automobile access point from a mobile device;
generating, by the automobile access point, a passcode;
sending, by the automobile access point, the passcode to the mobile device;
receiving, by the automobile access point, a message from the mobile device, wherein the message includes the passcode and a media access control address of the mobile device;
receiving, by the automobile access point, an input parameter from an automobile access point operator, wherein the input parameter designates one or more rules for a secure key, and wherein the one or more rules are based on at least a number of access attempts by the mobile device;
generating, by the automobile access point, the secure key based on the media access control address of the mobile device and the input parameter in response to receiving the message, wherein the secure key provides network access to the mobile device via the automobile access point according to the one or more rules; and
logging, by the automobile access point, the network access as a chargeable event.

12. The method of claim 11, wherein the chargeable event is based on one or more of an attempt to access a network and a connection time.

13. The method of claim 11, wherein the secure key is managed by a rules engine.

14. The method of claim 11, wherein the request from the mobile device is initiated by opening a web browser in the mobile device.

* * * * *

UNITED STATES PATENT AND TRADEMARK OFFICE
CERTIFICATE OF CORRECTION

PATENT NO.         : 8,484,707 B1                                             Page 1 of 1
APPLICATION NO.    : 13/156438
DATED              : July 9, 2013
INVENTOR(S)        : Lyle T. Bertz, Robert H. Burcham and Jason R. Delker It is certified that error appears in the above-identified patent and that said Letters Patent is hereby corrected as shown below:

On the title page, item (73), delete Assignee "Spring Communications Company L.P." and add Assignee -- "Sprint Communications Company L.P." --.

Signed and Sealed this
Twenty-fifth Day of February, 2014

Michelle K. Lee
*Deputy Director of the United States Patent and Trademark Office*